(12) United States Patent
Sakai

(10) Patent No.: US 11,836,581 B2
(45) Date of Patent: Dec. 5, 2023

(54) LEARNING MODEL GENERATION APPARATUS, IMAGE CORRECTION APPARATUS, AND NON-TRANSITORY COMPUTER READABLE MEDIUM FOR GENERATING LEARNING MODEL BASED ON CLASSIFIED IMAGE INFORMATION

(71) Applicant: FUJIFILM Business Innovation Corp., Tokyo (JP)

(72) Inventor: Noriko Sakai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 630 days.

(21) Appl. No.: 16/792,896

(22) Filed: Feb. 18, 2020

(65) Prior Publication Data

US 2021/0084218 A1 Mar. 18, 2021

(30) Foreign Application Priority Data

Sep. 18, 2019 (JP) .................. 2019-169913

(51) Int. Cl.
*G06N 20/00* (2019.01)
*G02B 5/00* (2006.01)
(Continued)

(52) U.S. Cl.
CPC ............. *G06N 20/00* (2019.01); *G02B 5/005* (2013.01); *G06F 18/24* (2023.01); *G06V 10/774* (2022.01);
(Continued)

(58) Field of Classification Search
CPC ........ G06N 20/00; G02B 5/005; G06F 18/24; G06F 18/214; G06V 10/774;
(Continued)

(56) References Cited

U.S. PATENT DOCUMENTS 7,076,119 B2    7/2006 Takemoto
2019/0130216 A1*  5/2019 Tomioka ............... G06F 18/214
(Continued)

FOREIGN PATENT DOCUMENTS

JP          2003111005          4/2003
JP          2004213567          7/2004
(Continued)

OTHER PUBLICATIONS

"Office Action of Japan Counterpart Application", dated Sep. 12, 2023, with English translation thereof, p. 1-p. 6, Japanese Patent Application No. 2019-169913.

*Primary Examiner* — Luong T Nguyen
(74) *Attorney, Agent, or Firm* — JCIPRNET

(57) ABSTRACT

A learning model generation apparatus includes: a processor configured to obtain captured image data and plural setting values which are set for each imaging condition in a case where the image data is captured and have dependency relationships with one another; calculate an evaluation value for classifying image information which is information obtained from the image data by using the plural setting values; classify the image information based on the evaluation value; and generate a learning model for each classification by using the image information.

20 Claims, 10 Drawing Sheets

(51) Int. Cl.
  *G06F 18/24* (2023.01)
  *H04N 23/60* (2023.01)
  *H04N 23/71* (2023.01)
  *H04N 23/73* (2023.01)
  *G06V 10/774* (2022.01)
  *G06V 10/778* (2022.01)

(52) U.S. Cl.
  CPC ......... *G06V 10/7796* (2022.01); *H04N 23/64* (2023.01); *H04N 23/71* (2023.01); *H04N 23/73* (2023.01)

(58) Field of Classification Search
  CPC .... G06V 10/7796; H04N 23/64; H04N 23/71; H04N 23/73; H04N 23/75; H04N 23/76
  See application file for complete search history.

(56) References Cited

U.S. PATENT DOCUMENTS

| | | | |
|---|---|---|---|
| 2019/0132565 A1 | 5/2019 | Iwafuchi et al. | |
| 2019/0287154 A1* | 9/2019 | Kakinuma | G06Q 30/0631 |
| 2020/0012899 A1* | 1/2020 | Nakayama | G06F 18/24 |
| 2020/0250578 A1* | 8/2020 | Odate | G06V 10/774 |

FOREIGN PATENT DOCUMENTS

| | | |
|---|---|---|
| JP | 2014228995 | 12/2014 |
| JP | 2015109024 | 6/2015 |
| JP | 2018084861 | 5/2018 |
| JP | 2019083445 | 5/2019 |

\* cited by examiner

FIG. 3

| ISO VALUE | 50 | 64 | 80 | 100 | 125 | 160 | 200 | 250 | 320 | 400 | 500 | 640 |
|---|---|---|---|---|---|---|---|---|---|---|---|---|
| SCALE VALUE | 0 | 0 | | -1 | | | -2 | | | -3 | | |

| SHUTTER SPEED | 1 | 0.8 | 0.6 | 0.5 | 0.4 | 0.3 | 0.25 | 0.2 | 1/6 | 1/8 | 1/13 |
|---|---|---|---|---|---|---|---|---|---|---|---|
| SCALE VALUE | 0 | | | 1 | | | 2 | | | 3 | |

| IRIS DIAPHRAGM VALUE | 4.0 | 4.5 | 5.0 | 5.6 | 6.3 | 7.1 | 8.0 | 9.0 | 10.0 | 11.0 | 13.0 | 14.0 |
|---|---|---|---|---|---|---|---|---|---|---|---|---|
| SCALE VALUE | 1 | | | 2 | | | 3 | | | 4 | | |

FIG. 4

| EVALUATION VALUE | 4 | 5 | 6 | 7 | 8 | 9 | 10 | 11 | 12 | 13 | 14 | 15 |
|---|---|---|---|---|---|---|---|---|---|---|---|---|
| NUMBER OF IMAGE INFORMATION | 0 | 50 | 600 | 100 | 80 | 20 | 100 | 800 | 500 | 600 | 50 | 200 |
| CLASSIFICATION | - | A | A | B | B | B | B | C | D | E | - | - |
| PRESENCE OR ABSENCE OF MODEL | ABSENCE | PRESENCE | PRESENCE | PRESENCE | PRESENCE | PRESENCE | PRESENCE | PRESENCE | PRESENCE | PRESENCE | ABSENCE | ABSENCE |

FIG. 7

| ISO VALUE | 50 | 64 | 80 | 100 | 125 | 160 | 200 | 250 | 320 | 400 | 500 | 640 | 800 | 1000 | 1200 |
|---|---|---|---|---|---|---|---|---|---|---|---|---|---|---|---|
| NUMBER OF IMAGE INFORMATION | 50 | 0 | 20 | 200 | 100 | 0 | 0 | 50 | 0 | 0 | 0 | 50 | 200 | 100 | 30 |
| CLASSIFICATION | C11 | | | C12 | | | C13 | | | C14 | | | C15 | | |
| PRESENCE OR ABSENCE OF MODEL | ABSENCE | | | PRESENCE | | | ABSENCE | | | ABSENCE | | | PRESENCE | | |

LEARNING MODEL GENERATION APPARATUS, IMAGE CORRECTION APPARATUS, AND NON-TRANSITORY COMPUTER READABLE MEDIUM FOR GENERATING LEARNING MODEL BASED ON CLASSIFIED IMAGE INFORMATION

CROSS-REFERENCE TO RELATED APPLICATIONS

This application is based on and claims priority under 35 USC 119 from Japanese Patent Application No. 2019-169913 filed Sep. 18, 2019.

BACKGROUND

(i) Technical Field

The present invention relates to a learning model generation apparatus, an image correction apparatus, a non-transitory computer readable medium storing a learning model generation program, and a non-transitory computer readable medium storing an image correction program.

(ii) Related Art

JP2004-213567A discloses an image learning apparatus which learns an image input from an imaging apparatus and determines a target existing in the image, the image learning apparatus including: initial registration means that images the target in a preset imaging condition and initially registers an imaging profile indicating the captured image and the imaging condition of the image; shortfall image obtainment means that determines a shortfall image required for the learning based on at least one of the image or the imaging profile registered by the initial registration means and causes the imaging apparatus to obtain the shortfall image; shortfall image addition registration means that additionally registers the shortfall image obtained by the shortfall image obtainment means and an imaging profile attached to the shortfall image in the initial registration means; learning sample extraction means that extracts a learning sample used for the learning from at least one of the image or the imaging profile registered in the shortfall image addition registration means; and learning means that performs the learning by using the extracted learning sample.

JP2019-083445A discloses an image processing apparatus including: reception means that receives a set of pieces of image information from image information before color conversion and image information after the color conversion; and color conversion feature generation means that generates a color conversion feature for color-converting an image based on imaging setting information set in an imaging condition when an image before the conversion is captured.

JP2003-111005A discloses an image processing apparatus which performs an image process on image data obtained by a digital camera, the image processing apparatus including: tag information input means that obtains tag information attached to the image data; scene determination means that determines an imaging scene of the image data based on the tag information; image processing condition setting means that sets an image processing condition according to the imaging scene; image processing means that performs an image process on the image data according to the set image processing condition; and postprocessing means that executes a postprocess according to an image type on the image data on which the image process is performed, in which the postprocessing means determines a type of the image based on photographer information, selects an output profile according to the determined image type, and executes the postprocess by using the selected output profile.

SUMMARY

In a case where input image data is corrected by using machine learning, a lot of image data and the number of learnings are required, and the learning work is complicated. There is a technology in which learning is performed by using image data classified by an image data group having high use frequencies or a tag by considering an imaging condition, and a learning model of outputting output data corresponding to a relationship of the learned image data to input data is generated.

Meanwhile, image data and learning work corresponding to each imaging condition are required, and the number of learning models cannot always be reduced.

Aspects of non-limiting embodiments of the present disclosure relate to a learning model generation apparatus, an image correction apparatus, a non-transitory computer readable medium storing a learning model generation program, and a non-transitory computer readable medium storing an image correction program capable of reducing the number of learning models even in a case where imaging conditions are diverse, as compared with a case where a learning model for each of a plurality of imaging conditions is generated.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a learning model generation apparatus including: a processor configured to obtain captured image data and a plurality of setting values which are set for each imaging condition in a case where the image data is captured and have dependency relationships with one another; calculate an evaluation value for classifying image information which is information obtained from the image data by using the plurality of setting values; classify the image information based on the evaluation value; and generate a learning model for each classification by using the image information.

BRIEF DESCRIPTION OF THE DRAWINGS

Exemplary embodiment(s) of the present invention will be described in detail based on the following figures, wherein:

FIG. 3 is schematic diagram illustrating an example of a relationship between each setting value of an ISO sensitivity, a shutter speed, and an iris diaphragm and a scale value according to each exemplary embodiment;

FIG. 4 is a schematic diagram illustrating an example of a relationship between an evaluation value and classification used for explaining classification of image information according to each exemplary embodiment;

FIG. 7 is a schematic diagram illustrating an example of a relationship between a setting value and classification used for explaining classification of image information according to a second exemplary embodiment;

DETAILED DESCRIPTION

First Exemplary Embodiment

Hereinafter, an exemplary embodiment of a technology of the present disclosure will be described in detail with reference to the accompanying drawings. An example in which an image correction apparatus 10 according to the present exemplary embodiment is a server which generates a learning model which learns correction contents by using image data before correction and image data after the correction, and corrects image data by using the generated learning model will be described. Meanwhile, the present exemplary embodiment is not limited thereto. For example, the image correction apparatus 10 may be a terminal such as a personal computer and a tablet, or may be a multifunction machine or the like equipped with a scan function. Further, a learning model generation apparatus according to the present exemplary embodiment will be described in a form of being integrated with the image correction apparatus 10. Meanwhile, the present exemplary embodiment is not limited thereto. The learning model generation apparatus is, for example, a terminal and a server different from the image correction apparatus 10, and may transmit a learning model corresponding to input image data to the image correction apparatus 10 via a network.

Further, a mode in which a correction content according to the present exemplary embodiment is a combination of pixel values of each RGB color space in image data before correction and image data after the correction will be described. Meanwhile, the present exemplary embodiment is not limited thereto. The correction content may be a change amount of the pixel value in the image data before the correction and the image data after the correction, or may be values such as each brightness and saturation or a certain correction content. In addition, a mode in which a color system according to the present exemplary embodiment is RGB will be described. Meanwhile, the present exemplary embodiment is not limited thereto. The color system may be CMYK or a Lab color system.

Figure 1:
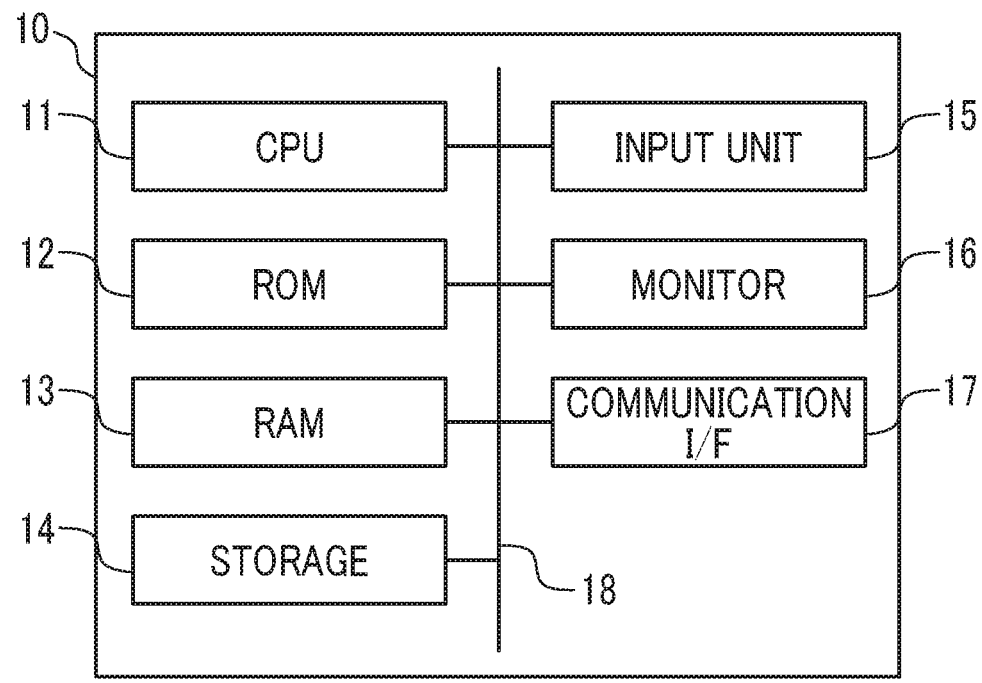
FIG. 1 is a block diagram illustrating an example of a hardware configuration of an image correction apparatus according to each exemplary embodiment.

A hardware configuration of the image correction apparatus 10 will be described with reference to FIG. 1. FIG. 1 is a block diagram illustrating an example of a hardware configuration of the image correction apparatus 10 according to the present exemplary embodiment. As illustrated in FIG. 1, the image correction apparatus 10 according to the present exemplary embodiment is configured to include a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to each other via a bus 18. Here, the CPU 11 is an example of a processor.

The CPU 11 collectively controls the entire image correction apparatus 10. The ROM 12 stores various programs, data, and the like including a learning model generation program and an image correction program used in the present exemplary embodiment. The RAM 13 is a memory used as a work area when executing various programs. The CPU 11 performs a process of generating a learning model and correcting image data by developing and executing the program stored in the ROM 12 into the RAM 13. The storage 14 is a hard disk drive (HDD), a solid state drive (SSD), a flash memory, or the like as an example. The storage 14 may store the learning model generation program, the image correction program, and the like. The input unit 15 is a mouse or a keyboard for inputting texts and the like. The monitor 16 displays the image data and the texts. The communication I/F 17 transmits and receives data.

Figure 2:
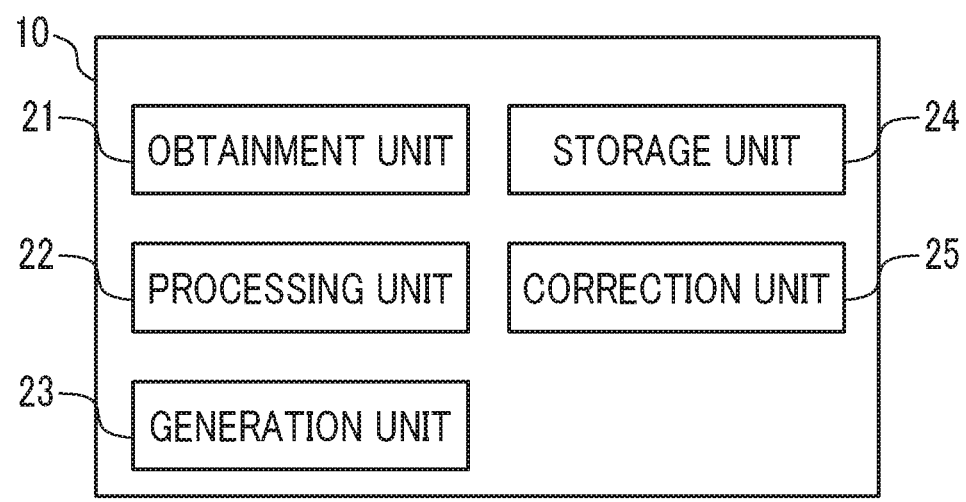
FIG. 2 is a block diagram illustrating an example of a functional configuration of the image correction apparatus according to each exemplary embodiment.

Next, a functional configuration of the image correction apparatus 10 will be described with reference to FIG. 2. FIG. 2 is a block diagram illustrating an example of a functional configuration of the image correction apparatus 10 according to each exemplary embodiment.

As illustrated in FIG. 2, the image correction apparatus 10 includes an obtainment unit 21, a processing unit 22, a generation unit 23, a storage unit 24, and a correction unit 25. The CPU 11 functions as the obtainment unit 21, the processing unit 22, the generation unit 23, the storage unit 24, and the correction unit 25 by executing the learning model generation program and the image correction program.

The obtainment unit 21 obtains captured image data and a plurality of setting values which are set for each imaging condition in a case where the image data is captured and have a dependency relationship with one another. The setting value according to the present exemplary embodiment is a value of a condition relating to exposure of image data, and a mode in which there are at least two of an iris diaphragm, a shutter speed, or an ISO sensitivity will be described. Meanwhile, the present exemplary embodiment is not limited thereto. The setting value may be a value of another condition other than the condition relating to the exposure of the image data, and may be the presence or absence of a light source and a flash, a spectral sensitivity, a photoelectric conversion function, luminance, a minimum F value of a lens, a subject distance, a photometric method, a focal length of the lens, or the like.

The processing unit 22 calculates an evaluation value for classifying information (hereinafter, referred to as "image information") obtained from the image data by using the plurality of setting values, and classifies the image information based on the evaluation value. The processing unit 22 classifies the image information based on the evaluation value, and further classifies the image information based on one setting value among the plurality of setting values. The processing unit 22 classifies the image information for each of at least one range of a predetermined evaluation value range or a predetermined setting value range. The evaluation value according to the present exemplary embodiment is a sum of values (hereinafter, referred to as "scale value") obtained by normalizing at least two of the plurality of setting values. The image information according to the present exemplary embodiment is, for example, an RGB pixel value of image data before correction and image data after the correction.

Specifically, the processing unit 22 obtains a scale value by using a setting value for each imaging condition set in image data, calculates an evaluation value by adding the scale value for each imaging condition, and classifies image information obtained from the image data for each evaluation value. The processing unit 22 further classifies the image information classified for each evaluation value by using at least one setting value of an iris diaphragm value, a shutter speed, or an ISO sensitivity. For example, after classifying a plurality of pieces of image information for each evaluation value, a plurality of pieces of classified image information are classified based on a setting value for each imaging condition of an ISO sensitivity.

In a case where a correction process is performed on the image data, the processing unit 22 calculates an evaluation value by using the plurality of setting values obtained from the input image data, and selects a learning model generated by using the evaluation value. Further, the processing unit 22 calculates a priority order of the imaging conditions in the image information classified for each setting value, and selects the learning model by using the evaluation value and the imaging condition having a priority order set to the highest priority. The priority order according to the present exemplary embodiment is calculated by a setting value of the imaging condition. For example, in a case where a setting value of an iris diaphragm is smaller than a threshold value, the processing unit 22 sets a priority order of the iris diaphragm to the highest priority, and in a case where the setting value of the iris diaphragm is equal to or greater than the threshold value and a setting value of a shutter speed is greater than a threshold value, the processing unit 22 sets a priority order of the shutter speed to the highest priority. Further, in a case where the setting value of the iris diaphragm is equal to or greater than the threshold value and the setting value of the shutter speed is equal to or smaller than the threshold value, the processing unit 22 sets a priority order of an ISO sensitivity to the highest priority.

Specifically, the processing unit 22 selects the learning model by using the evaluation value or the evaluation value and the setting value. In a case where selecting the learning model for the image information classified by using the evaluation value and the setting value, the processing unit 22 calculates a priority order from the setting value and selects the learning model in the imaging condition having the highest priority. For example, in a case where the ISO sensitivity has the highest priority, the processing unit 22 calculates an evaluation value from a setting value for each imaging condition of the image data, and selects a learning model matching the calculated evaluation value and the setting value of the ISO sensitivity.

The generation unit 23 uses the image information so as to generate the learning model for each classification. The generation unit 23 generates the learning model in a case where the number of pieces of classified image information exceeds a predetermined threshold value, and generates the learning model again in a case where classified image information is newly added. That is, in a case where the number of pieces of classified image information exceeds the predetermined number, the generation unit 23 generates the learning model by using the evaluation value or the image information classified based on the evaluation value and the setting value. In addition, in a case where new image information is classified after generating the learning model, the generation unit 23 generates the learning model again including the new image information.

The storage unit 24 stores the learning model for the image information classified for each evaluation value or for each evaluation value and setting value.

The correction unit 25 corrects the image data by using the learning model.

Next, before an action of the image correction apparatus is described, a method in which the image correction apparatus 10 according to the present exemplary embodiment classifies image information and selects a learning model will be described with reference to FIGS. 3 to 4.

A scale value of a setting value for each imaging condition will be described with reference to FIG. 3. FIG. 3 is schematic diagram illustrating an example of a relationship between each setting value of an ISO sensitivity, a shutter speed, and an iris diaphragm and a scale value according to the present exemplary embodiment.

As an example, as illustrated in FIG. 3, a scale value is set to a value corresponding to a setting value of each imaging condition. The top of FIG. 3 is a schematic diagram illustrating a relationship between a setting value of an ISO sensitivity and a scale value, the middle of FIG. 3 is a schematic diagram illustrating a relationship between a setting value of a shutter speed and a scale value, and the bottom of FIG. 3 is a schematic diagram illustrating a relationship between a setting value of an iris diaphragm and a scale value.

The scale value according to the present exemplary embodiment is a value set by normalizing setting values of imaging conditions which determines exposure of image data. The respective imaging conditions have dependency relationships with one another, and it is possible to perform imaging at the identical exposure level by changing the setting value of the imaging condition.

For example, in a case where the setting value of the iris diaphragm is reduced (the iris diaphragm is opened), the shutter speed is reduced (faster) so as to adjust the amount of light and adjust exposure to the identical level as the exposure before the setting value is changed. In this case, regarding the scale value, the scale value of the iris diaphragm becomes smaller, but the scale value of the shutter speed becomes larger. That is, in a case where imaging is performed with the identical level even in a case where the imaging conditions are different from each other, a scale value obtained by normalizing the setting values is set so that the evaluation values are identical.

The mode in which the scale values according to the present exemplary embodiment are dependent on one another is described. Meanwhile, the present exemplary embodiment is not limited thereto. A scale value independent for each setting of an imaging condition may be set. Further, regarding the scale value according to the present exemplary embodiment, the mode in which a scale value is set for each range of the setting value is described. Meanwhile, the present exemplary embodiment is not limited thereto. The scale value may be set for each setting value.

Next, classification of image information according to the present exemplary embodiment will be described. FIG. 4 is a schematic diagram illustrating an example of a relationship between an evaluation value and classification used for explaining classification of image information according to the present exemplary embodiment.

As an example, as illustrated in FIG. 4, the classification of the image information is performed for each predetermined evaluation value range, and a learning model is generated by using image information classified for each evaluation value range. Specifically, each evaluation value range is set according to the number of pieces of image information classified for each evaluation value. In a case where the number of classified image information exceeds a predetermined number (for example, 300), the image correction apparatus 10 generates a learning model by using the classified image information. In a case where the number of classified image data does not exceed the predetermined number, the image correction apparatus 10 determines whether or not the number of classified image information exceeds the predetermined number by including image information classified into the adjacent evaluation value. In a case where the number obtained by including the image information classified into the adjacent evaluation value exceeds the predetermined number, the image correction apparatus 10 generates the learning model by using the classified image information including the image information classified into the adjacent evaluation value.

For example, as illustrated in FIG. 4, the image correction apparatus 10 calculates an evaluation value for each image data, classifies image information for each evaluation value, and generates a learning model by using the classified image information. As illustrated in FIG. 4, in a case where the number of pieces of image information classified the evaluation value of "4" is "0", the image correction apparatus 10 does not generate the learning model. Further, in a case where the number of pieces of image information classified the evaluation value of "5" is "50", the number of "50" does not exceed the predetermined number (for example, 300), so that the image correction apparatus 10 determines whether or not a sum of the number of pieces of image data of the adjacent evaluation value of "6" and the number of pieces of image data of the evaluation value of "5" exceeds the predetermined number. In a case where the number of pieces of image information exceeds the predetermined number, the image correction apparatus 10 generates the learning model by using the image information classified into the evaluation values of "5" and "6", and sets the classification to "A". Further, the image correction apparatus 10 generates the learning model by using the image information, in which a sum of the pieces of image information exceeds the predetermined number, classified into the evaluation values of "7" to "10", and sets the classification to "B".

In this manner, the image correction apparatus 10 sets a range for generating the learning model from the number of image information classified for each evaluation value, and classifies the learning models.

Further, in a case of selecting a learning model to correct an image, the image correction apparatus 10 calculates an evaluation value of the input image data and selects the learning model according to the evaluation value.

For example, in the relationship between the evaluation value and the classification illustrated in FIG. 4, in a case where an evaluation value of the input image data is "8", the image correction apparatus 10 selects a learning model generated by using the image information classified the classification "B", and performs correction on the image data. The image classification according to the present exemplary embodiment is described as being classified for each range of evaluation values. Meanwhile, the present exemplary embodiment is not limited thereto. The image information may be classified for each evaluation value, and a learning model may be generated for each evaluation value.

Figure 5:
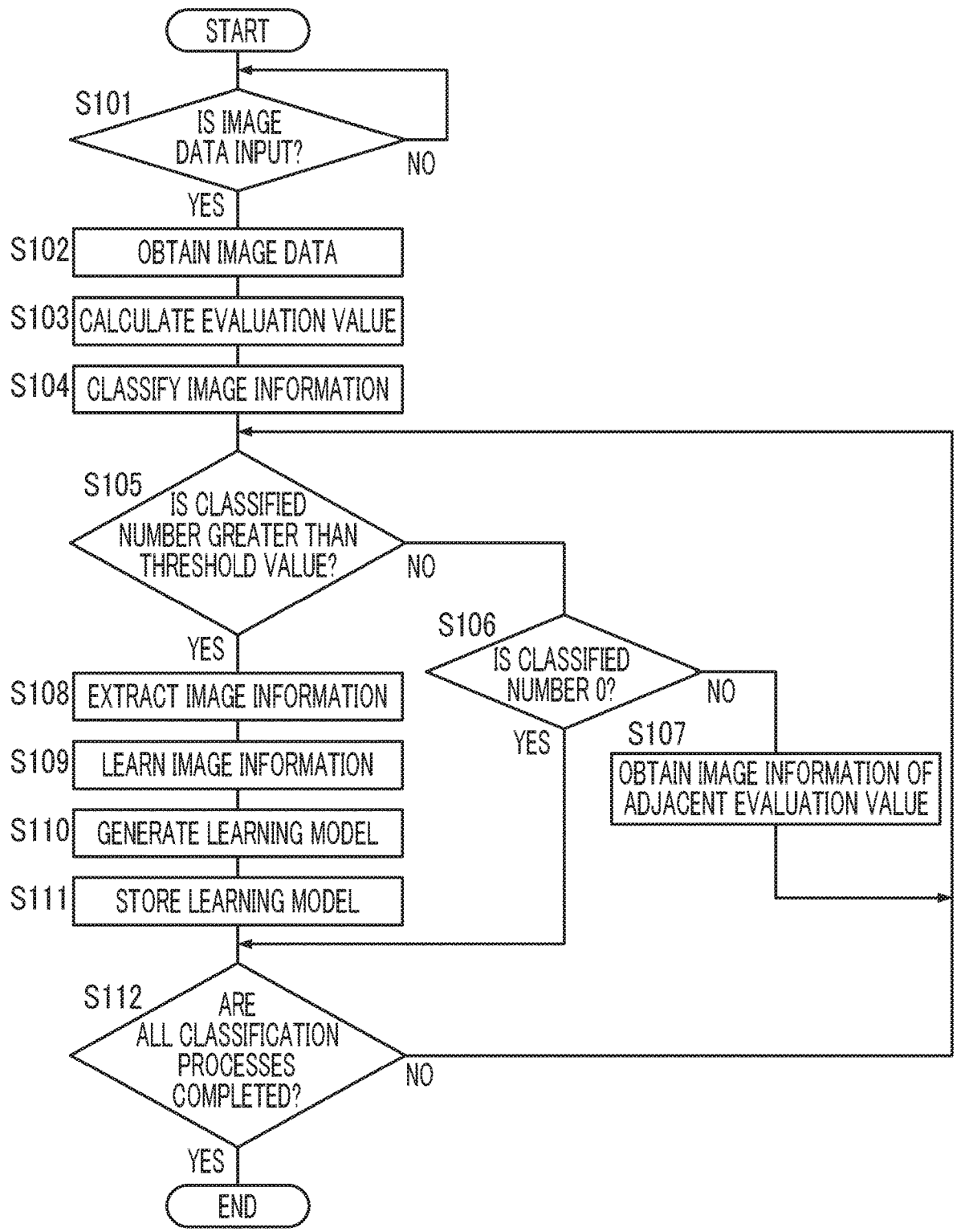
FIG. 5 is a flowchart illustrating an example of a learning model generation process according to a first exemplary embodiment.
Figure 6:
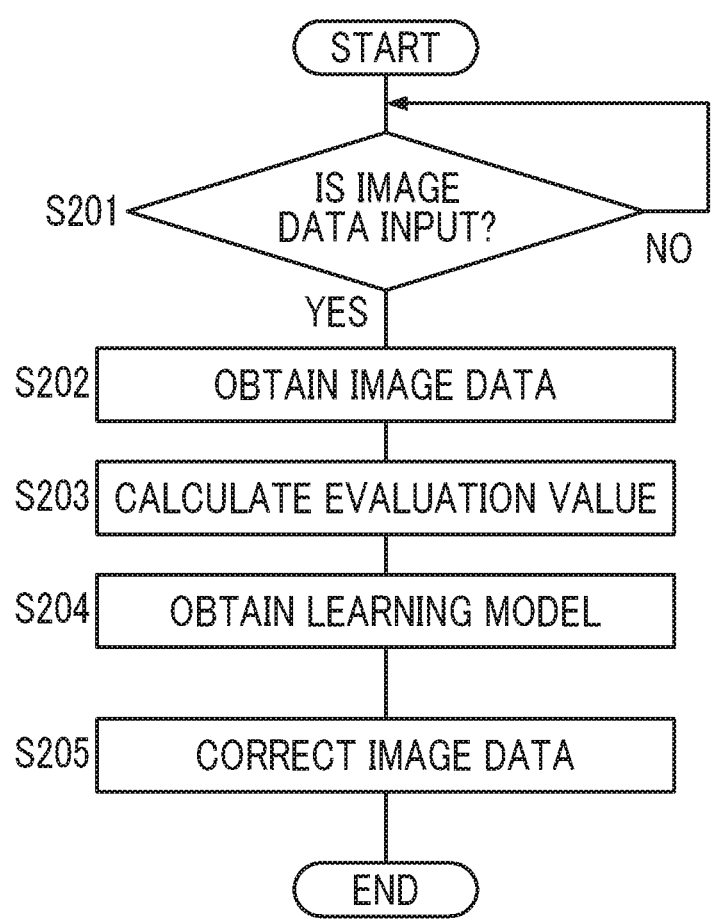
FIG. 6 is a flowchart illustrating an example of an image correction process according to the first exemplary embodiment.

Next, an action of a learning model generation program and an image correction program according to the present exemplary embodiment will be described with reference to FIGS. 5 to 6. First, FIG. 5 is a flowchart illustrating an example of a learning model generation process according to the present exemplary embodiment. The CPU 11 reads the learning model generation program from the ROM 12 or the storage 14 and executes the learning model generation program so as to execute the learning model generation process illustrated in FIG. 5. In the information process illustrated in FIG. 5, for example, in a case where a user inputs an instruction to execute a learning model generation program, the learning model generation process is executed.

In step S101, the CPU 11 determines whether or not image data is input. In a case where the image data is input (YES in step S101), the CPU 11 proceeds to step S102. On the other hand, in a case where the image data is not input (NO in step S101), the CPU 11 stands by until the image data is input.

In step S102, the CPU 11 obtains the input image data. Here, along with the image data, image information obtained from the image data and a setting value of an imaging condition set in the image data are obtained. In a case where the input image data is image data for addition, image data input in the past is obtained from the storage unit along with the input image data.

In step S103, the CPU 11 obtains a scale value from the setting value of the imaging condition and calculates an evaluation value.

In step S104, the CPU 11 classifies the image information by using the evaluation value.

In step S105, the CPU 11 determines whether or not the number of pieces of image information classified for each evaluation value is greater than a predetermined number. In a case where the number of pieces of image information classified for each evaluation value is greater than the predetermined number (YES in step S105), the CPU 11 proceeds to step S108. On the other hand, in a case where the number of pieces of image information classified for each evaluation value is equal to or smaller than the predetermined number (NO in step S105), the CPU 11 proceeds to step S106.

In step S106, the CPU 11 determines whether or not the number of pieces of image information classified for each evaluation value is 0. In a case where the number of pieces of classified image information is 0 (YES in step S106), the CPU 11 proceeds to step S112. On the other hand, in a case where the number of pieces of classified image information is not 0 (NO in step S106), the CPU 11 proceeds to step S107.

In step S107, the CPU 11 obtains image information classified into the adjacent evaluation value.

In step S108, the CPU 11 extracts image information classified for each evaluation value.

In step S109, the CPU 11 learns the extracted image information.

In step S110, the CPU 11 generates a learning model which learns the image information.

In step S111, the CPU 11 stores the generated learning model.

In step S112, the CPU 11 determines whether or not the classification process on all the image data is completed. In a case where the classification process on all the image data is completed (YES in step S112), the CPU 11 terminates the process. On the other hand, in a case where the classification process on all the image data is not completed (NO in step S112), the CPU 11 proceeds to step S105.

Next, an image correction process according to the present exemplary embodiment will be described with reference to FIG. 6. FIG. 6 is a flowchart illustrating an example of an image correction process according to the present exemplary embodiment. The CPU 11 reads an image correction program from the ROM 12 or the storage 14 and executes the image correction program so as to execute the image correction process illustrated in FIG. 6.

In step S201, the CPU 11 determines whether or not image data is input. In a case where the image data is input (YES in step S201), the CPU 11 proceeds to step S202. On the other hand, in a case where the image data is not input (NO in step S201), the CPU 11 stands by until the image data is input.

In step S202, the CPU 11 obtains the input image data. Here, along with the image data, a setting value of an imaging condition set in the image data is obtained.

In step S203, the CPU 11 obtains a scale value from the setting value of the imaging condition and calculates an evaluation value.

In step S204, the CPU 11 selects and obtains a learning model by using the calculated evaluation value.

In step S205, the CPU 11 corrects the input image data by using the obtained learning model.

As described above, according to the present exemplary embodiment, the image information is classified by the evaluation value calculated from the imaging condition, and the learning model is generated. Therefore, the number of learning models can be reduced even in a case where the imaging conditions are diverse, as compared with a case where a learning model for each of a plurality of imaging conditions is generated.

Second Exemplary Embodiment

In the first exemplary embodiment, the mode in which the image information is classified by the evaluation value calculated from the imaging condition, and the learning model is generated is described. In the present exemplary embodiment, a mode in which image information is classified by an evaluation value and a setting value, and a learning model is generated will be described. In the present exemplary embodiment, a hardware configuration (see FIG. 1) of the image correction apparatus 10, a functional configuration (see FIG. 2) of the image correction apparatus 10, and schematic diagrams (see FIG. 3) illustrating a relationship between each setting value and a scale value have the identical manner to the first exemplary embodiment, so a description thereof will not be repeated. Further, a schematic diagram (see FIG. 4) illustrating a relationship between an evaluation value and classification according to the present exemplary embodiment is identical to the schematic diagram in the first exemplary embodiment, so a description thereof will not be repeated.

Classification of image information and selection of a learning model will be described with reference to FIG. 7. FIG. 7 is a schematic diagram illustrating an example of a relationship between a setting value and classification used for explaining classification of image information according to the present exemplary embodiment. A mode in which the classification of image information and the selection of a learning model according to the present exemplary embodiment are performed by using an evaluation value and a setting value will be described.

In a case of classifying image information, the image correction apparatus 10 uses an evaluation value and a setting value. As an example, as illustrated in FIG. 7, the image correction apparatus 10 classifies the image information for each evaluation value described with reference to FIG. 4, and then further classifies the image information using the setting value.

As an example, a case where image information having an evaluation value of "11" calculated from a setting value of image data is classified will be described. In a case where the evaluation value is "11", in the classification in FIG. 4, the image information is classified into classification "C". The image correction apparatus 10 further classifies 800 pieces of image information classified into the classification "C" in FIG. 4 by using an ISO sensitivity. For example, in a case where a setting value of an ISO sensitivity of the image data is "125", the image information is classified into classification "C12" in FIG. 7. In a case where the number of pieces of image information classified into classification "C11" to classification "C15" in FIG. 7 exceeds a predetermined number (for example, 100), the image correction apparatus 10 generates a learning model by using the classified image information and stores the learning model in the storage unit 24. In a case where the number of pieces of classified image information does not exceed the predetermined number, the image correction apparatus 10 does not generate the learning model, as illustrated in FIG. 7.

As an example, classification based on a setting value according to the present exemplary embodiment is described with reference to the mode in which the image information is classified by using the setting value of the ISO sensitivity. Meanwhile, the present exemplary embodiment is not limited thereto. The image information may be classified by using a setting value of a shutter speed or an iris diaphragm, or may be classified by combining setting values of an imaging condition. Further, classification to be performed is not limited to one. For example, the image information is classified according to each imaging condition for one piece of image data, such as classification using a setting value of an iris diaphragm or classification using a setting value of an ISO sensitivity, and a learning model for each imaging condition may be generated. In addition, the classification according to the present exemplary embodiment is described with reference to the mode in which the image information is classified for each predetermined evaluation value and each predetermined setting value range. Meanwhile, the present exemplary embodiment is not limited thereto. Without defining the range, classification may be performed for each evaluation value or each setting value, and classification may be performed each predetermined range of at least one of the evaluation value or the setting value.

In addition, in a case of correcting image data, the image correction apparatus 10 calculates an evaluation value from the setting value of the input image data and selects a learning model so as to perform correction on the image data by using an evaluation value and a setting value.

As an example, a case where image data having an evaluation value of "11" is corrected will be described. In a case where an evaluation value calculated from a setting value of the image data is "11", the image data is classified into "C" in the classification in FIG. 4. Further, in a case where a setting value of an ISO sensitivity of the image data is "125", the image correction apparatus 10 selects a learning model generated from the image data classified into the classification "C12" in FIG. 7 and corrects the image data.

That is, the image correction apparatus 10 selects a learning model by using the setting value after specifying classification of the evaluation value.

Since the learning model is used for correction, it is necessary to determine which setting value of the imaging condition is used and select the learning model. In the present exemplary embodiment, a mode in which a priority order is assigned to each imaging condition, and a learning model is selected by using a setting value of an imaging condition having the highest priority will be described. Meanwhile, the present exemplary embodiment is not limited thereto. The learning model may be selected by using a setting value of a predetermined imaging condition.

Next, a priority order of an imaging condition according to the present exemplary embodiment will be described. The priority order according to the present exemplary embodiment is set by using a setting value of the imaging condition.

As an example, in a case where a setting value of an iris diaphragm is smaller than a predetermined threshold value, the image correction apparatus 10 sets a priority order of the iris diaphragm to the highest priority. Further, in a case where the setting value of the iris diaphragm is equal to or greater than the predetermined threshold value and a shutter speed is greater than a predetermined threshold value, a priority order of the shutter speed is set to the highest priority. In addition, in a case where the setting value of the iris diaphragm is equal to or greater than the predetermined threshold value and the shutter speed is equal to or smaller than the predetermined threshold value, the image correction apparatus 10 sets a priority order of an ISO sensitivity to the highest priority. Further, the image correction apparatus 10 compares scale values obtained from setting values of two imaging conditions for which priority orders are not set, and sets the imaging condition having the smaller scale value to the second priority order.

A condition for setting a priority order according to the present exemplary embodiment is set so that the highest priority is assigned to the condition in which an image quality of the image data is likely to deteriorate, such as an image being easily blurred or cloudy. Meanwhile, the present exemplary embodiment is not limited thereto. The condition for setting the priority order may be set so that a learning model generated by using high-quality image data can be selected.

The image correction apparatus 10 selects the learning model by using an evaluation value and a setting value of an imaging condition having a priority order of the highest priority. In addition, in a case where the learning model matching the setting value of the imaging condition having the highest priority is not generated, a learning model is selected by using the evaluation value and a setting value of an imaging condition having the second highest priority. In this manner, in a case where the matched learning model is not generated, the image correction apparatus 10 changes the imaging condition used in a case of selecting the learning model, and selects the learning model.

Figure 8:
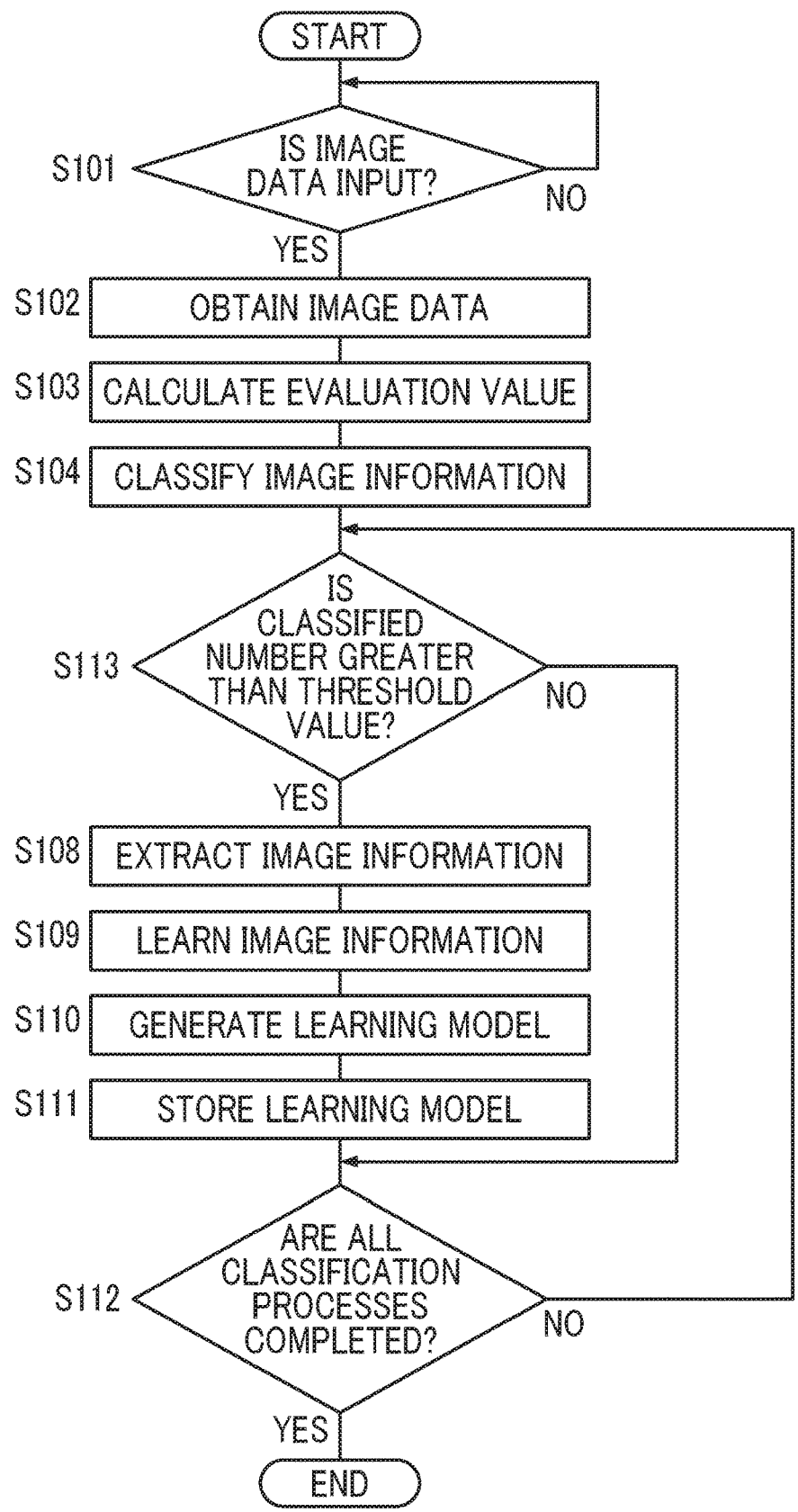
FIG. 8 is a flowchart illustrating an example of a learning model generation process according to the second exemplary embodiment.
Figure 9:
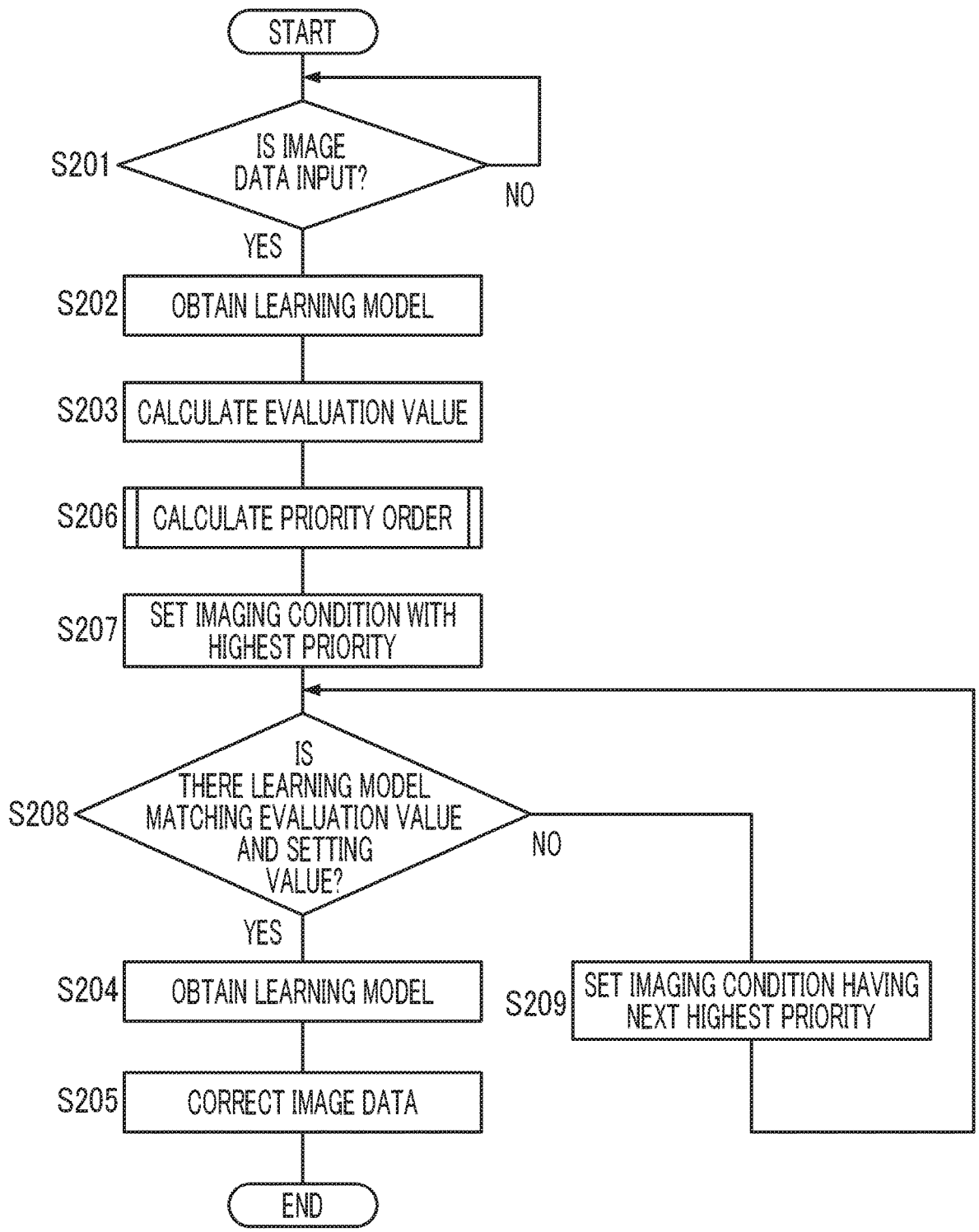
FIG. 9 is a flowchart illustrating an example of an image correction process according to the second exemplary embodiment.
Figure 10:
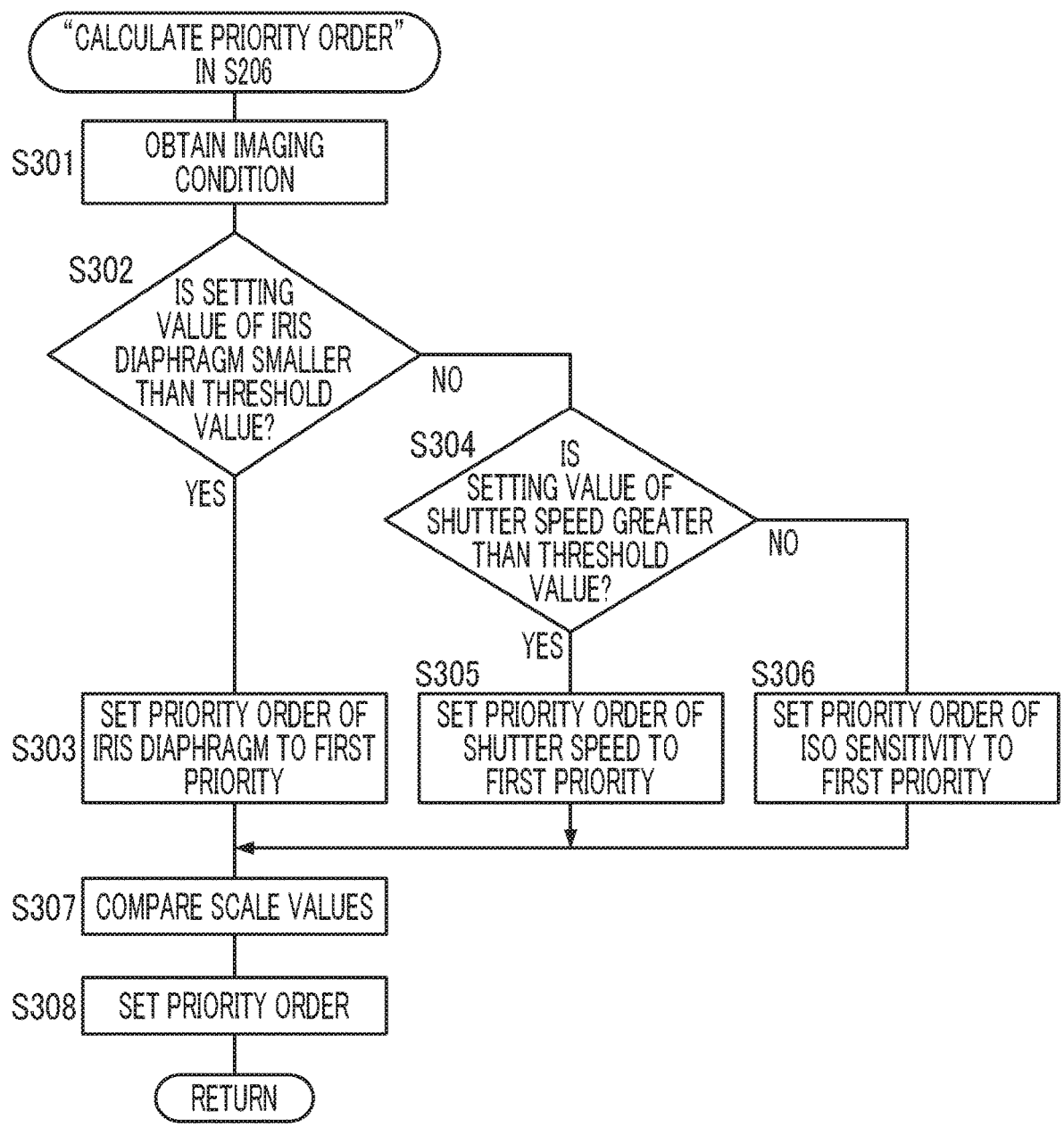
FIG. 10 is a flowchart illustrating an example of a priority order calculation process according to the second exemplary embodiment.

Next, another action of the learning model generation program and the image correction program according to the present exemplary embodiment will be described with reference to FIGS. 8 to 10. First, FIG. 8 is a flowchart illustrating an example of a learning model generation process according to the second exemplary embodiment. The CPU 11 reads the learning model generation program from the ROM 12 or the storage 14 and executes the learning model generation program so as to execute the learning model generation process illustrated in FIG. 8. In the information process illustrated in FIG. 8, for example, in a case where the user inputs an instruction to execute a learning model generation program, the learning model generation process is executed. In FIG. 8, the identical steps as the learning model generation process illustrated in FIG. 5 are denoted by the identical reference numerals to the reference numerals in FIG. 5, and a description thereof will not be repeated.

In step S104, the CPU 11 classifies image information by using an evaluation value and a setting value.

In step S113, the CPU 11 determines whether or not the number of pieces of image information classified for each evaluation value and each setting value is greater than a predetermined number. In a case where the number of pieces of image information classified for each evaluation value and each setting value is greater than the predetermined number (YES in step S113), the CPU 11 proceeds to step S108. On the other hand, in a case where the number of pieces of image information classified for each evaluation value and each setting value is equal to or smaller than the predetermined number (NO in step S113), the CPU 11 proceeds to step S112.

Next, an action of an image correction process program according to the present exemplary embodiment will be described with reference to FIG. 9. FIG. 9 is a flowchart illustrating an example of an image correction process according to the second exemplary embodiment. The CPU 11 reads the image correction process program from the ROM 12 or the storage 14 and executes the image correction process program so as to execute the information process illustrated in FIG. 9. In the image correction process illustrated in FIG. 9, for example, in a case where the user inputs an instruction to execute an image correction process program, the image correction process is executed. In FIG. 9, the identical steps as the image correction process illustrated in FIG. 6 are denoted by the identical reference numerals as the reference numerals in FIG. 6, and a description thereof will not be repeated.

In step S206, the CPU 11 calculates a priority order. Details of a priority order calculation process will be described with reference to FIG. 9 to be described below.

In step S207, the CPU 11 sets an imaging condition set with the highest priority.

In step S208, the CPU 11 determines whether or not there is a learning model matching an evaluation value and a setting value. In a case where there is the learning model matching the evaluation value and the setting value (YES in step S208), the CPU 11 proceeds to step S204. On the other hand, in a case where there is no learning model matching the evaluation value and the setting value (NO in step S208), the CPU 11 proceeds to step S209.

In step S209, the CPU 11 sets an imaging condition set with the next highest priority.

Next, an action of a priority order calculation process program according to the present exemplary embodiment will be described with reference to FIG. 10. FIG. 10 is a flowchart illustrating an example of a priority order calculation process according to the second exemplary embodiment. The CPU 11 reads the priority order calculation process program from the ROM 12 or the storage 14 and executes the priority order calculation process program so as to execute the priority order calculation process illustrated in FIG. 10. In the priority order calculation process illustrated in FIG. 10, for example, in a case where the user inputs an instruction to execute a priority order calculation process program by an image correction process, the priority order calculation process is executed.

In step S301, the CPU 11 obtains an imaging condition set to image data. Here, a setting value of the imaging condition is obtained, and a scale value is obtained from the setting value.

In step S302, the CPU 11 determines whether or not a setting value of an iris diaphragm is smaller than a predetermined threshold value. In a case where the setting value of the iris diaphragm is smaller than the predetermined threshold value (YES in step S302), the CPU 11 proceeds to step S303. On the other hand, in a case where the setting value of the iris diaphragm is equal to or greater than the predetermined threshold value (NO in step S302), the CPU 11 proceeds to step S304.

In step S303, the CPU 11 sets a priority order of the iris diaphragm to the first priority.

In step S304, the CPU 11 determines whether or not a setting value of a shutter speed is greater than a predetermined threshold value. In a case where the setting value of the shutter speed is greater than the predetermined threshold value (YES in step S304), the CPU 11 proceeds to step S305. On the other hand, in a case where the setting value of the shutter speed is equal to or smaller than the predetermined threshold value (NO in step S304), the CPU 11 proceeds to step S306.

In step S305, the CPU 11 sets a priority order of the shutter speed to the first priority.

In step S306, the CPU 11 sets a priority order of an ISO sensitivity to the first priority.

In step S307, the CPU 11 compares scale values of an imaging condition for which priority order is not set.

In step S308, the CPU 11 sets a priority order higher in ascending order of the scale values of the imaging conditions for which the priority order is not set.

As described above, according to the present exemplary embodiment, the image information is classified by using the evaluation value and the setting value of the imaging condition, and the learning model is selected by using the evaluation value and the setting value of the imaging condition.

The mode in which the priority order according to the present exemplary embodiment is set in a case where the learning model is selected is described. Meanwhile, the present exemplary embodiment is not limited thereto. The priority order may be set in a case where the image information is classified.

Third Exemplary Embodiment

In the second exemplary embodiment, the mode in which the priority order is calculated from the setting value of the imaging condition, and the learning model is selected is described. In the present exemplary embodiment, a mode in which a range selected in a case where a learning model is selected expands will be described. In the present exemplary embodiment, a hardware configuration (see FIG. 1) of the image correction apparatus 10, a functional configuration (see FIG. 2) of the image correction apparatus 10, and schematic diagrams (see FIG. 3) illustrating a relationship between each setting value and a scale value have the identical manner to the first exemplary embodiment, so a description thereof will not be repeated. Further, in the present exemplary embodiment, a schematic diagram (see FIG. 4) illustrating a relationship between an evaluation value and classification, a flowchart (see FIG. 5) illustrating a learning model generation process, and a schematic diagram (see FIG. 7) illustrating a relationship between a setting value and classification is identical to the schematic diagram in the first exemplary embodiment, so a description thereof will not be repeated.

A method of expanding a range selected in a case where a learning model is selected will be described with reference to FIG. 4 and FIG. 7.

As an example, a case where image data having an evaluation value of "11" and a setting value of "250" of an ISO sensitivity is input will be described. In a case of performing an image correction process, first, in the classification in FIG. 4, a learning model is selected so that the evaluation value of "11" is classified into the classification of "C", and in the classification in FIG. 7, the setting value of "250" of the ISO sensitivity is classified into the classification of "C13". Meanwhile, as illustrated in FIG. 7, in a case where the learning model classified into "C13" is not generated, the image correction apparatus 10 selects a learning model in the adjacent classification and corrects the image data. Specifically, as illustrated in FIG. 7, the image correction apparatus 10 selects a learning model of the classification of "C12" adjacent to the classification of "C13".

Figure 11:
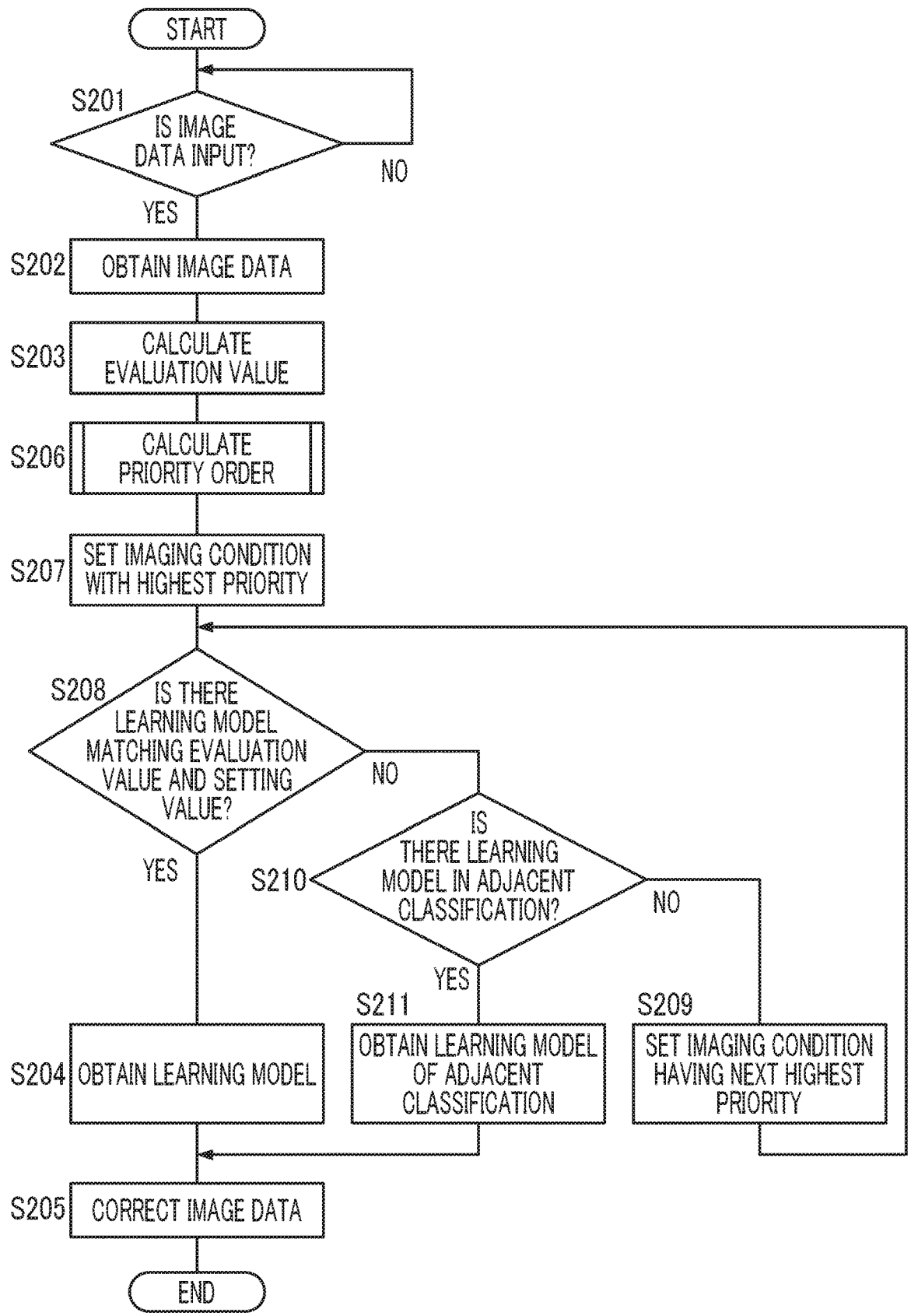
FIG. 11 is a flowchart illustrating an example of an image correction process according to a third exemplary embodiment.

Next, another action of the image correction process program according to the present exemplary embodiment will be described with reference to FIG. 11. FIG. 11 is a flowchart illustrating an example of an image correction process according to a third exemplary embodiment. The CPU 11 reads the image correction process program from the ROM 12 or the storage 14 and executes the image correction program so as to execute the information process illustrated in FIG. 11. In the image correction process illustrated in FIG. 11, for example, in a case where the user inputs an instruction to execute an image correction process program, the image correction process is executed. In FIG. 11, the identical steps as the image correction process illustrated in FIG. 9 are denoted by the identical reference numerals to the reference numerals in FIG. 9, and a description thereof will not be repeated.

In step S208, the CPU 11 determines whether or not there is a learning model matching an evaluation value and a setting value. In a case where there is the learning model matching the evaluation value and the setting value (YES in step S208), the CPU 11 proceeds to step S204. On the other hand, in a case where there is no learning model matching the evaluation value and the setting value (NO in step S208), the CPU 11 proceeds to step S210.

In step S210, the CPU 11 determines whether or not there is a learning model in classification adjacent to classification specified by the evaluation value and the setting value. In a case where there is the learning model in the classification adjacent to the classification specified by the evaluation value and the setting value (YES in step S210), the CPU 11 proceeds to step S211. On the other hand, in a case where there is no learning model in the classification adjacent to the classification specified by the evaluation value and the setting value (NO in step S210), the CPU 11 proceeds to step S209.

In step S211, the CPU 11 obtains the learning model of the adjacent classification.

In the present exemplary embodiment, the mode in which the learning model of the adjacent classification is selected is described. Meanwhile, the present exemplary embodiment is not limited thereto. A range in which the learning model is selected is not limited thereto. For example, a learning model classified two adjacent classifications specified from the evaluation value and the setting value may be selected, or a learning model classified into a predetermined range may be selected.

In addition, the mode in which the learning model generation apparatus and the image correction apparatus according to the present exemplary embodiment use captured image data as input data is described. Meanwhile, the present exemplary embodiment is not limited thereto. For example, the input data may be image data obtained by assigning a predetermined setting value of an imaging condition to an image edited with Photoshop (registered trademark) or the like, an image created such as computer graphics (CG), or the like.

As described above, according to the present exemplary embodiment, even in a case where a learning model matching an evaluation value and a setting value of an imaging condition is not generated, a correction process is performed on image data by using a learning model of the adjacent classification.

In addition, the configuration of the image correction apparatus 10 described in the exemplary embodiment described above is merely an example, and may be changed according to a situation within a range not deviating from the gist.

Further, a flow of the process of the program described in the exemplary embodiment is also an example and unnecessary steps may be deleted, new steps may be added, or the processing order may be exchanged within the range not deviating from the gist.

In the embodiments above, the term "processor" refers to hardware in abroad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in each exemplary embodiment, the mode in which the program of the information process is stored (installed) in advance in the storage 14 is described, but the exemplary embodiment is not limited thereto. The program may be recorded on a recording medium such as a compact disc only memory (CD-ROM), a digital versatile disc read only memory (DVD-ROM), or a universal serial bus (USB) memory. In addition, the program may be downloaded from an external apparatus via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A learning model generation apparatus comprising:
a processor configured to:
obtain image data and a plurality of setting values which are set for each imaging condition in a case where the image data is captured and have dependency relationships with one another;
calculate an evaluation value for classifying image information which is information obtained from the image data by using the plurality of setting values;
classify the image information based on the evaluation value; and
generate a learning model for each classification by using the image information.

2. The learning model generation apparatus according to claim 1,
wherein the processor classifies the image information based on the evaluation value, and then classifies the image information based on one setting value among the plurality of setting values.

3. The learning model generation apparatus according to claim 2,
wherein the processor classifies the image information for each of at least one range of a predetermined range of the evaluation value or a predetermined range of the setting value.

4. The learning model generation apparatus according to claim 1, wherein the processor generates the learning model in a case where a number of pieces of the classified image information exceeds a predetermined threshold value.

5. The learning model generation apparatus according to claim 2, wherein the processor generates the learning model in a case where a number of pieces of the classified image information exceeds a predetermined threshold value.

6. The learning model generation apparatus according to claim 3, wherein the processor generates the learning model in a case where a number of pieces of the classified image information exceeds a predetermined threshold value.

7. The learning model generation apparatus according to claim 1,
wherein the processor generates the learning model again in a case where the classified image information is newly added.

8. The learning model generation apparatus according to claim 2,
wherein the processor generates the learning model again in a case where the classified image information is newly added.

9. The learning model generation apparatus according to claim 1,
wherein the evaluation value is a sum of scale values which are values obtained by normalizing at least two of the plurality of setting values.

10. An image correction apparatus comprising:
a first processor configured to:
calculate an evaluation value by using a plurality of setting values obtained from an image data in a case where the evaluation value is calculated by the image correction apparatus; and
select a learning model generated by a learning model generation apparatus by using the evaluation value and correct the image data, wherein the learning model generation apparatus comprising:
a second processor configured to:
obtain the image data and the plurality of setting values which are set for each imaging condition in a case where the image data is captured and have dependency relationships with one another;
calculate the evaluation value for classifying image information which is information obtained from the image data by using the plurality of setting values in a case where the evaluation value is calculated by the learning model generation apparatus;

classify the image information based on the evaluation value; and generate the learning model for each classification by using the image information.

11. The image correction apparatus according to claim 10, wherein the plurality of setting values comprises at least two of an iris diaphragm, a shutter speed, or an ISO sensitivity.

12. The image correction apparatus according to claim 11, wherein the first processor calculates a priority order of the setting value by using the plurality of setting values, and selects the learning model by using the evaluation value and the setting value having the priority order set to a highest priority.

13. The image correction apparatus according to claim 12, wherein in a case where a setting value of the iris diaphragm is smaller than a threshold value, the first processor sets a priority order of the iris diaphragm to a highest priority.

14. The image correction apparatus according to claim 12, wherein in a case where the setting value of the iris diaphragm is equal to or greater than the threshold value and a setting value of the shutter speed is greater than a threshold value, the first processor sets a priority order of the shutter speed to a highest priority.

15. The image correction apparatus according to claim 12, wherein in a case where a setting value of the iris diaphragm is equal to or greater than a threshold value and a setting value of the shutter speed is equal to or smaller than a threshold value, the first processor sets a priority order of the ISO sensitivity to a highest priority.

16. The image correction apparatus according to claim 10, wherein in a case where the learning model is generated by using the image information classified for each predetermined range of the evaluation value, the first processor selects the learning model generated by using the image information classified into a range corresponding to the evaluation value.

17. The image correction apparatus according to claim 16, wherein in a case where the image information classified for each predetermined range of the evaluation value, and the learning model is generated by using the image information obtained by classifying the image information classified for each predetermined range of the evaluation value for each predetermined range of the setting value of the imaging condition, the first processor selects the learning model generated by using the image information classified into a range corresponding to the evaluation value and the setting value.

18. The image correction apparatus according to claim 17, wherein in a case where there is no learning model generated by using the image information classified into the predetermined range of the evaluation value or the predetermined range of the setting value, the first processor selects the learning model by expanding the predetermined range of the evaluation value or the predetermined range of the setting value.

19. A non-transitory computer readable medium storing a learning model generation program for causing a computer to execute a process, the process comprising:

obtaining image data and a plurality of setting values which are set in a case where the image data is captured and have dependency relationships with one another;

calculating an evaluation value for classifying image information which is information obtained from the image data by using the plurality of setting values;

classifying the image information based on the evaluation value; and generating a learning model for each classification by using the image information.

20. A non-transitory computer readable medium storing an image correction program for causing a computer to execute a process, the process comprising:

calculating an evaluation value by using a plurality of setting values obtained from an image data; and selecting a learning model generated by a learning model generation apparatus by using the evaluation value and correcting the image data, wherein the learning model generation apparatus comprising:

a processor configured to:

obtain the image data and the plurality of setting values which are set for each imaging condition in a case where the image data is captured and have dependency relationships with one another;

calculate the evaluation value for classifying image information which is information obtained from the image data by using the plurality of setting values in a case where the evaluation value is calculated by the learning model generation apparatus;

classify the image information based on the evaluation value; and generate the learning model for each classification by using the image information.

\* \* \* \* \*